(12) United States Patent
Chen et al.

(10) Patent No.: US 11,500,503 B1
(45) Date of Patent: Nov. 15, 2022

(54) ELECTRONIC DEVICE

(71) Applicant: HENGHAO TECHNOLOGY CO., LTD., Hsin-chu County (TW)

(72) Inventors: Chun-Jung Chen, Taoyuan (TW); Su-Hsuan Chang, Taoyuan (TW)

(73) Assignee: HENGHAO TECHNOLOGY CO., LTD., Hsin-chu County (TW)

( * ) Notice: Subject to any disclaimer, the term of this patent is extended or adjusted under 35 U.S.C. 154(b) by 0 days.

(21) Appl. No.: 17/537,438

(22) Filed: Nov. 29, 2021

(30) Foreign Application Priority Data

Sep. 27, 2021 (TW) .................................. 110135776

(51) Int. Cl.
| | | |
|---|---|---|
| *H05K 1/02* | (2006.01) | |
| *G06F 3/0488* | (2022.01) | |
| *G06F 3/041* | (2006.01) | |
| *H03K 17/96* | (2006.01) | |
| *G06F 3/044* | (2006.01) | |

(52) U.S. Cl.
CPC .......... *G06F 3/0446* (2019.05); *G06F 3/0445* (2019.05); *G06F 2203/04112* (2013.01)

(58) Field of Classification Search
CPC ............... H01L 27/323; H01L 27/3232; H01L 27/3248; H01L 27/326; H01L 51/5056; H01L 51/5096; H01L 51/0096; H01L 51/5246; H01L 51/5256; H01L 51/5284; H01L 27/3276; H01L 27/3246; H01L 27/3225; H01L 27/3262; H01L 27/3279; G06F 1/1656; G06F 1/1684; G06F 3/0412; G06F 3/0446; G02F 1/133512

See application file for complete search history.

(56) References Cited

U.S. PATENT DOCUMENTS

| 10,114,491 | B1* | 10/2018 | Han | G06F 3/0412 |
|---|---|---|---|---|
| 2014/0048315 | A1* | 2/2014 | Chae | G06F 3/04164 |
| | | | | 174/255 |
| 2016/0091998 | A1* | 3/2016 | Chyan | G06F 3/04883 |
| | | | | 345/174 |
| 2016/0224184 | A1* | 8/2016 | Nordback | G06F 3/0488 |
| 2017/0322670 | A1 | 11/2017 | Wang | |

FOREIGN PATENT DOCUMENTS

| CN | 106020528 A | 10/2016 |
|---|---|---|
| TW | I621135 B | 4/2018 |
| TW | I659347 B | 5/2019 |
| WO | 2015/107977 A1 | 7/2015 |
| WO | 2016/048320 A1 | 3/2016 |
| WO | 2016/153531 A1 | 9/2016 |

* cited by examiner

*Primary Examiner* — Md Saiful A Siddiqui

(74) *Attorney, Agent, or Firm* — Winston Hsu

(57) ABSTRACT

An electronic device includes a first conductive layer including a first metal mesh including a first metal line segment, a second metal line segment and a first compensating line segment. The first metal line segment extends along a first direction and has a first end, and the second metal line segment extends along the first direction and has a second end, wherein a first breakpoint exists between the first end and the second end. The first compensating line segment is separated from and electrically insulated from the first metal line segment and the second metal line segment, the first compensating line segment does not completely overlap the first breakpoint, and a minimum distance between the first breakpoint and each first segment end of the first compensating line segment is less than or equal to 50 μm.

15 Claims, 6 Drawing Sheets

ELECTRONIC DEVICE

BACKGROUND OF THE INVENTION

1. Field of the Invention

The present invention relates to an electronic device, and more particularly, to an electronic device having a metal mesh with low visibility.

2. Description of the Prior Art

As the evolution and development of electronic devices, the electronic devices have become an indispensable item. In order to make the electronic device have a sensing function (e.g., touch sensing function), the electronic device may include a metal mesh having a plurality of electrodes, so as to perform the sensing function by the electrodes. However, since a plurality of breakpoints exist in the metal mesh (e.g., the breakpoint is configured to separate the electrodes), an opening rate of a unit area having the breakpoint would be different from an opening rate of a unit area which does not have the breakpoint. Thus, the visibility of the metal mesh is enhanced, thereby decreasing the viewing quality of the electronic device (the user is easy to aware the existence of the metal mesh). Accordingly, the industry is committed to reducing the visibility of the metal mesh.

SUMMARY OF THE INVENTION

It is therefore a primary objective of the present invention to provide an electronic device having a metal mesh, wherein the metal mesh includes a compensating line segment, so as to compensate a breakpoint in the metal mesh, thereby reducing the visibility of the metal mesh.

An embodiment of the present invention provides an electronic device including a substrate and a first conductive layer. The first conductive layer is disposed on the substrate, and the first conductive layer includes a first metal mesh including a first metal line segment, a second metal line segment and a first compensating line segment. The first metal line segment extends along a first direction, and the first metal line segment has a first end. The second metal line segment extends along the first direction, and the second metal line segment has a second end, wherein the first metal line segment and the second metal line segment are separated from each other, a first imaginary line extending along the first direction passes through the first end and the second end, and a part of the first imaginary line existing between the first end and the second end is defined as a first breakpoint. The first compensating line segment is separated from and electrically insulated from the first metal line segment and the second metal line segment, wherein the first compensating line segment does not completely overlap the first breakpoint, the first compensating line segment has two first segment ends, and a minimum distance between the first breakpoint and each of the first segment ends is less than or equal to 50 μm.

In the present invention, since the compensating line segment is adjacent to the breakpoint, and the compensating line segment does not completely overlap the breakpoint, the compensating line segment has the function reducing or compensating the bad visual effect caused by the breakpoint. Also, since the compensating line segment and the metal line segment(s) adjacent to the breakpoint belong to the same conductive layer, the cost of the metal mesh having the compensating line segment can be reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
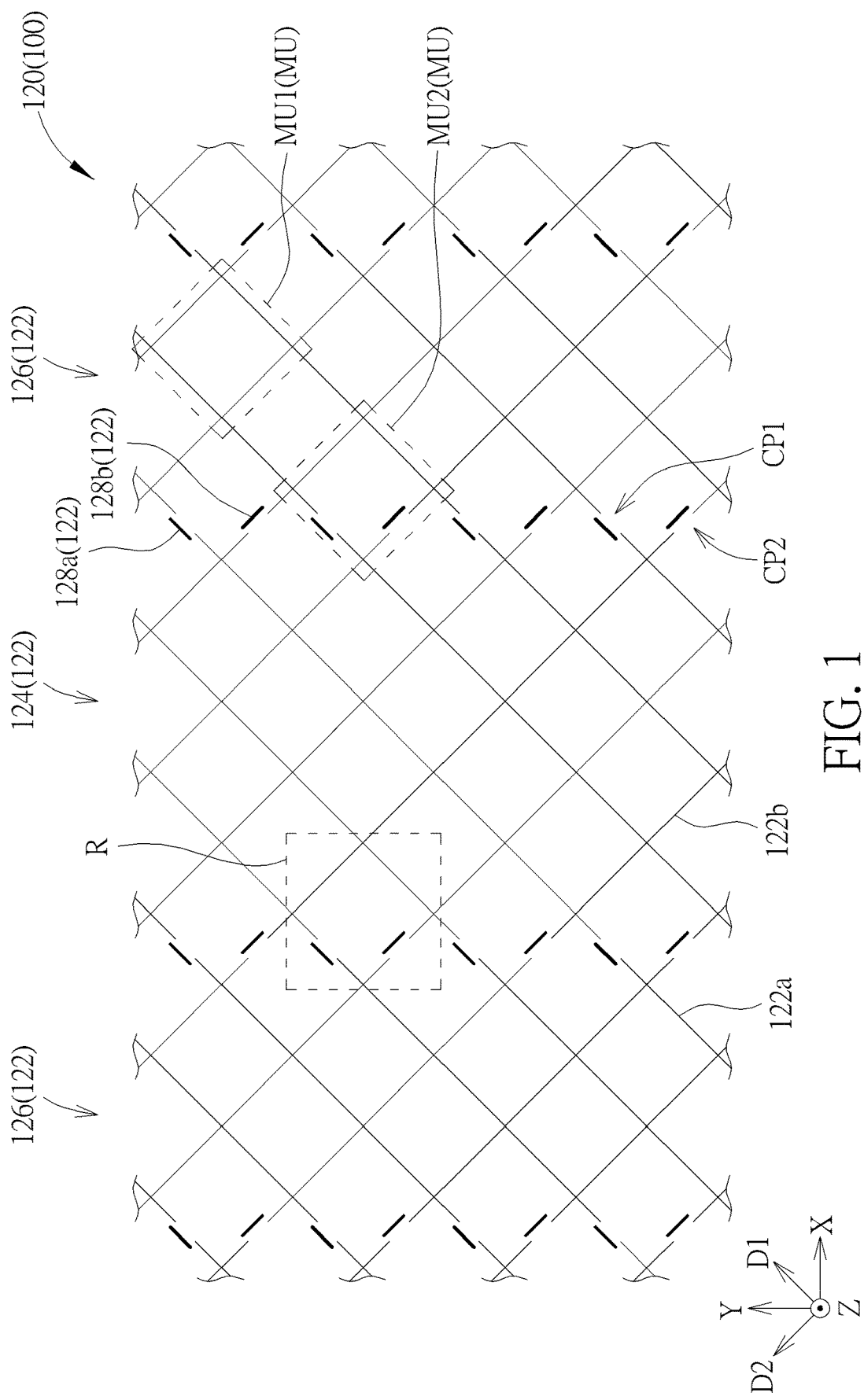
FIG. 1 is a schematic diagram of a top view illustrating a first conductive layer of an electronic device according to a first embodiment of the present invention.

To provide a better understanding of the present invention to those skilled in the art, preferred embodiments and typical material or range parameters for key components will be detailed in the follow description. These preferred embodiments of the present invention are illustrated in the accompanying drawings with numbered elements to elaborate on the contents and effects to be achieved. It should be noted that the drawings are simplified schematics, and the material and parameter ranges of key components are illustrative based on the present day technology, and therefore show only the components and combinations associated with the present invention, so as to provide a clearer description for the basic structure, implementing or operation method of the present invention. The components would be more complex in reality and the ranges of parameters or material used may evolve as technology progresses in the future. In addition, for ease of explanation, the components shown in the drawings may not represent their actual number, shape, and dimensions; details may be adjusted according to design requirements.

In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present invention, the corresponding features, areas, steps, operations and/or components would be pointed to existence, but not limited to the existence of one or a plurality of the corresponding features, areas, steps, operations and/or components.

In the following description and in the claims, it should be noted that the term "horizontal direction" represents a direction parallel to a direction X and a direction Y in drawing(s), the term "vertical direction" represents a direction parallel to a direction Z in drawing(s), and the term "in top view" represents a viewing result viewing along the vertical direction.

In the following description and in the claims, it should be noted that the term "overlap" represents that one component overlap another component in the direction Z. In unspecified circumstances, when two components "overlap", two components can partially overlap or completely overlap. It should be noted that the term "not completely overlap" represents that two components partially overlap or do not overlap. Namely, when a component C1 does not completely overlap a component D1, at least a portion of the component C1 does not overlap the component D1.

In the following description and in the claims, it should be noted that the term "parallel" represents that an included angle between two components can be less than or equal to an specific angle, such as 3 degrees or 1 degree.

Although terms such as first, second, third, etc., may be used to describe diverse constituent elements, such constituent elements are not limited by the terms. The terms are used only to discriminate a constituent element from other constituent elements in the specification, and the terms do not relate to the sequence of the manufacture if the specification do not describe. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present invention.

In the present invention, the type of the electronic device is not limited, and the electronic device has any suitable function. For example, the electronic device may have a display function and/or a sensing function based on requirement(s), but not limited thereto. In addition, the shape of the electronic device may be polygon (e.g., rectangle), a shape having a curved edge (e.g., circle) or other suitable shape, but not limited thereto.

For instance, the electronic device may be a touch display device, so as to display image(s) and sense touch, wherein the touch display device may be a color display device or a monochrome display device. The touch display device may include a plurality of pixels, the pixel may include at least one sub-pixel, and the number of the sub-pixel(s) in one pixel and the color of the light emitting from the sub-pixel(s) in one pixel may be designed based on requirement(s).

In the present invention, a width of a metal line, a width of a metal line segment and a width of a compensating line segment may be designed based on requirement(s). In the drawings of the present invention, in order to make the drawings clear, the width of the compensating line segment is greater than the width of the metal line and the width of the metal line segment in the drawings, but the design of the line width is not limited thereto.

Figure 2:
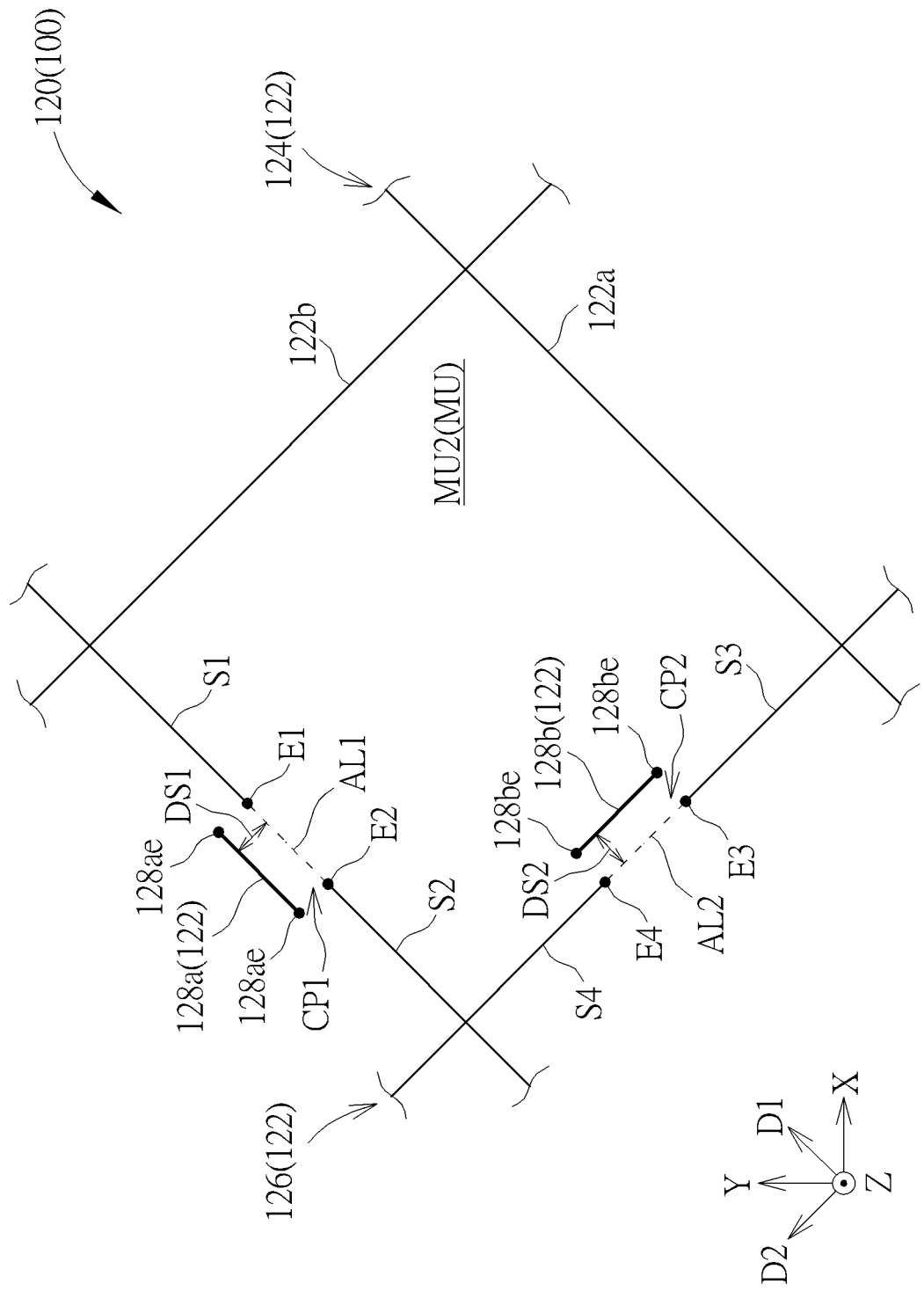
FIG. 2 is an enlarge diagram illustrating a region R of FIG. 1.
Figure 3:
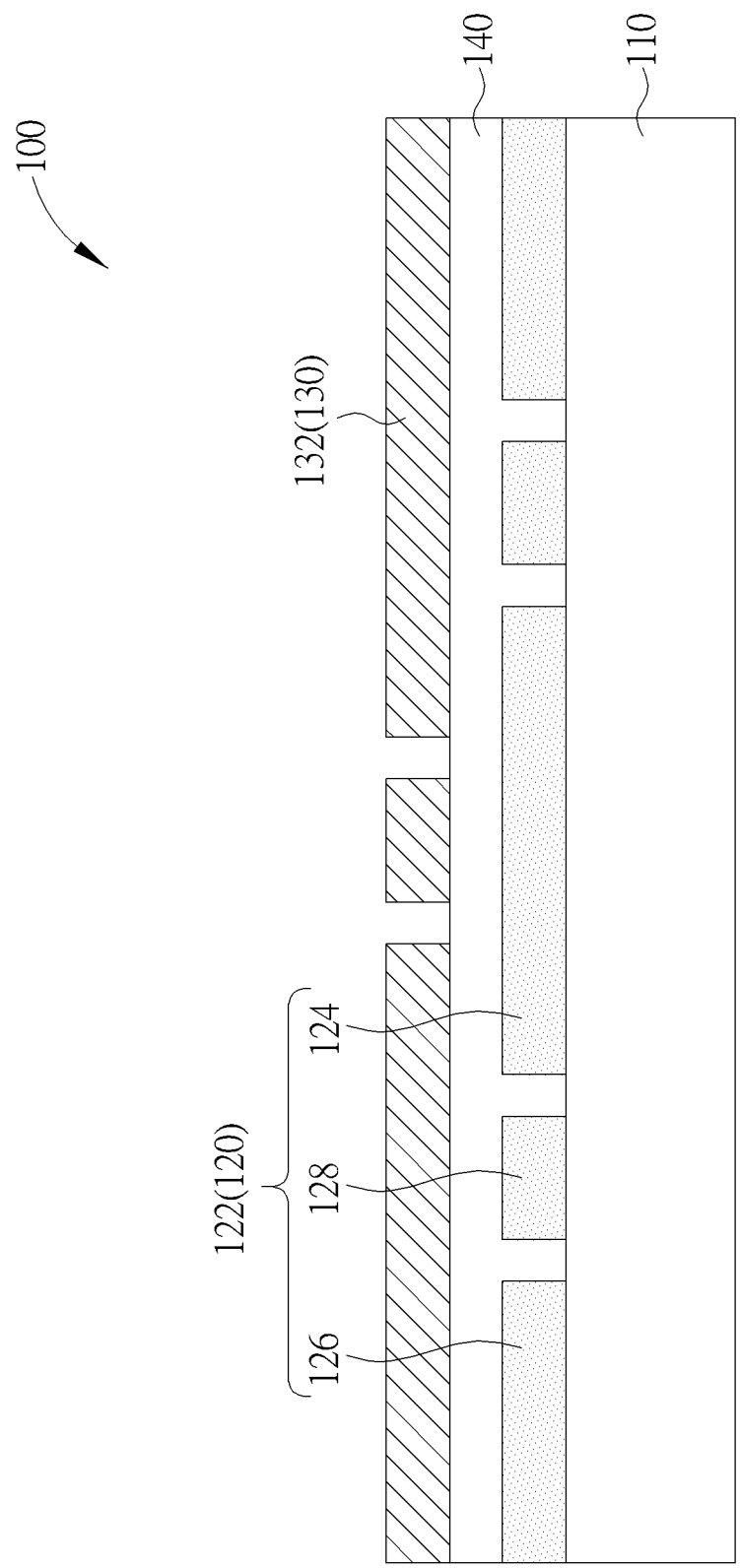
FIG. 3 is a schematic diagram of a cross sectional view illustrating an electronic device according to the first embodiment of the present invention.

Referring to FIG. 1 to FIG. 3, FIG. 1 is a schematic diagram of a top view illustrating a first conductive layer of an electronic device according to a first embodiment of the present invention, FIG. 2 is an enlarge diagram illustrating a region R of FIG. 1, and FIG. 3 is a schematic diagram of a cross sectional view illustrating an electronic device according to the first embodiment of the present invention. As shown in FIG. 1 to FIG. 3, the electronic device 100 may include a substrate 110, wherein various components in the electronic device 100 may be disposed in the substrate 110. The substrate 110 may include glass, quartz, sapphire, polyimide (PI), polyethylene terephthalate (PET), other suitable material or a combination thereof, so as to be a rigid substrate or a flexible substrate, but not limited thereto.

The electronic device 100 may include at least one conductive layer disposed on the substrate 110, wherein the material of the conductive layer may include such as metal, transparent conductive material (such as indium tin oxide (ITO), indium zinc oxide (IZO), etc.), other suitable conductive material or a combination thereof. In the present invention, as shown in FIG. 1 to FIG. 3, the conductive layer included in the electronic device 100 may include a first conductive layer 120.

The first conductive layer 120 may include a first metal mesh 122 having a plurality of metal mesh units MU, so as to perform a sensing function (e.g., touch sensing), wherein the first metal mesh 122 may be a sensor with any suitable type (e.g., a capacitive sensor). In the present invention, the shape of the metal mesh unit MU may be designed based on requirement(s). For instance, in FIG. 1 and FIG. 2, the first metal mesh 122 may include a plurality of metal lines 122a extending along a first direction D1 and a plurality of metal lines 122b extending along a second direction D2, so as to form the parallelogram metal mesh units MU, but not limited thereto.

It should be noted that, the first direction D1 and the second direction D2 are perpendicular to the direction Z, the first direction D1 and the second direction D2 are not parallel to each other, and the angle relations of the first direction D1, the second direction D2 and the direction X may be designed based on requirement(s). For instance, as shown in FIG. 1, the first direction D1 may not be perpendicular to the second direction D2, the first direction D1 and the second direction D2 may not be parallel to and perpendicular to the direction X, but not limited thereto. For instance (not shown in drawings), the first direction D1 may be parallel to the direction X, but not limited thereto. For instance (not shown in drawings), the first direction D1 may be perpendicular to the second direction D2, but not limited thereto.

In FIG. 1, the first metal mesh 122 may include a plurality of first mesh electrodes 124 and a plurality of second mesh electrodes 126, and the first mesh electrode 124 and the second mesh electrode 126 may be separated from each other. For example, the first metal mesh 122 and the second mesh electrode 126 are alternately arranged in the direction X, and a length-direction of the first mesh electrode 124 and a length-direction of the second mesh electrode 126 are parallel to the direction Y, but not limited thereto. In some embodiments, the first mesh electrode 124 and the second mesh electrode 126 may be sensing electrodes configured to sense, but not limited thereto. In some embodiments, the first mesh electrode 124 may be a sensing electrode configured to sense, and the second mesh electrode 126 may be a dummy electrode, but not limited thereto.

In FIG. 1 and FIG. 2, the first metal mesh 122 may have at least one breakpoint to make the first mesh electrode 124 and the second mesh electrode 126 be separated from each other, wherein FIG. 1 shows some metal mesh units MU have the breakpoint (in order to make the following description more clear, the metal mesh unit MU which does not have the breakpoint is referred as "the metal mesh unit MU1", and the metal mesh unit MU having the breakpoint is referred as "the metal mesh unit MU2"). In detail, the metal mesh unit MU2 may include a first metal line segment S1 and a second metal line segment S2, the first metal line segment S1 may be included in the first mesh electrode 124, the second metal line segment S2 may be included in the second mesh electrode 126, and the first metal line segment S1 and the second metal line segment S2 may be separated from each other and extend along the first direction D1 (i.e., the first metal line segment S1 is a portion of the metal line 122a, and the second metal line segment S2 is another portion of the metal line 122a). The first metal line segment S1 has a first end E1, the second metal line segment S2 has a second end E2, and a first breakpoint CP1 exists between the first end E1 of the first metal line segment S1 and the second end E2 of the second metal line segment S2. Specifically, FIG. 2 shows a first imaginary line AL1 extending along the first direction D1, the first imaginary line AL1 passes through the first end E1 and the second end E2, and a part of the first imaginary line AL1 existing between the first end E1 and the second end E2 is defined as the first breakpoint CP1.

Optionally, in FIG. 1 and FIG. 2, the metal mesh unit MU2 may include a third metal line segment S3 and a fourth metal line segment S4, the third metal line segment S3 may be included in the first mesh electrode 124, the fourth metal line segment S4 may be included in the second mesh electrode 126, and the third metal line segment S3 and the fourth metal line segment S4 may be separated from each other and extend along the second direction D2 (i.e., the third metal line segment S3 is a portion of the metal line 122b, and the fourth metal line segment S4 is another portion of the metal line 122b). The third metal line segment S3 has a third end E3, the fourth metal line segment S4 has a fourth end E4, and a second breakpoint CP2 exists between the third end E3 of the third metal line segment S3 and the fourth end E4 of the fourth metal line segment S4. Specifically, FIG. 2 shows a second imaginary line AL2 extending along the second direction D2, the second imaginary line AL2 passes through the third end E3 and the fourth end E4, and a part of the second imaginary line AL2 existing between the third end E3 and the fourth end E4 is defined as the second breakpoint CP2.

The existence of the breakpoint makes the visual effect of the metal mesh unit MU2 different from the visual effect of the metal mesh unit MU1, thereby causing the first metal mesh 122 to be easily aware to influence the viewing quality. Thus, in FIG. 1 and FIG. 2, the first metal mesh 122 includes at least one compensating line segment to compensate or decrease the bad visual effect caused by the breakpoint. In some embodiments, the compensating line segment may be such as a straight segment, but not limited thereto.

In detail, the first metal mesh 122 may include a first compensating line segment 128a to compensate or reduce the bad visual effect caused by the first breakpoint CP1. In the present invention, since the first compensating line segment 128a, the first metal line segment S1 and the second metal line segment S2 (the first metal line segment S1 and the second metal line segment S2 are disposed on two sides of the first breakpoint CP1) belong to the first conductive layer 120, in order to make the first compensating line segment 128a have the function reducing or compensating the bad visual effect caused by the first breakpoint CP1 and to make the first compensating line segment 128a electrically insulated from the first metal line segment S1 and the second metal line segment S2, in FIG. 1 and FIG. 2, the first compensating line segment 128a does not completely overlap (i.e., partially overlap or does not overlap) the first breakpoint CP1, and the first compensating line segment 128a is separated from the first metal line segment S1 and the second metal line segment S2.

In the present invention, the first compensating line segment 128a needs to be adjacent to the first breakpoint CP1 to compensate or reduce the bad visual effect caused by the first breakpoint CP1. In some embodiments, the first compensating line segment 128a may have two first segment ends 128ae, a minimum distance between the first breakpoint CP1 and each first segment end 128ae may be less than or equal to 50 μm or be less than or equal to 15 μm, but not limited thereto. In some embodiments, a minimum distance between the first compensating line segment 128a (any portion of the first compensating line segment 128a) and the first breakpoint CP1 may be less than or equal to 50 μm or be less than or equal to 15 μm, but not limited thereto. In this design of the distance, the first compensating line segment 128a may compensate or reduce the bad visual effect caused by the first breakpoint CP1 and decrease the possibility which the first compensating line segment 128a is aware by user. It should be noted that, if the distance between the first compensating line segment 128a and the first breakpoint CP1 is greater than 50 μm, the first compensating line segment 128a would lose its compensating function, such that the first compensating line segment 128a may be easily aware by user, thereby influencing the viewing quality.

In the present invention, the relation between the first compensating line segment 128a and the first breakpoint CP1 (i.e., the first compensating line segment 128a does not completely overlap the first breakpoint CP1) may be designed based on requirement(s). In some embodiments (as shown in FIG. 1 and FIG. 2), the first compensating line segment 128a does not overlap the first breakpoint CP1. For example, in FIG. 1 and FIG. 2, the first compensating line segment 128a may be parallel to the first direction D1, such that the first compensating line segment 128a may be parallel to the first metal line segment S1, the second metal line segment S2 and the first imaginary line AL1, but not limited thereto. In FIG. 1 and FIG. 2, a first distance DS1 may exist between the first compensating line segment 128a and the first breakpoint CP1, such that the first compensating line segment 128a does not overlap the first breakpoint CP1. For instance, the first distance DS1 may be greater than or equal to 3 μm and less than or equal to 50 μm, or may be greater than or equal to 3 μm and less than or equal to 15 μm, but not limited thereto. It should be noted that, if the distance between the first compensating line segment 128a and the first breakpoint CP1 is less than 3 μm, the first compensating line segment 128a may be connected to the first metal line segment S1 and/or the second metal line segment S2 due to defect or error of the forming process (e.g., an incomplete etching process), resulting in failure of the design of the first breakpoint CP1.

In some embodiments (as shown in FIG. 1 and FIG. 2), an angle between the first direction D1 and a connecting line connected by a midpoint of the first compensating line segment 128a and a midpoint of the first breakpoint CP1 may be greater than or equal to 80 degrees and less than or equal to 100 degrees, but not limited thereto. According to this design, an offset of the first compensating line segment 128a with respect to the first breakpoint CP1 in the first direction D1 may be decreased.

In the present invention, a length of the first compensating line segment 128a may be designed based on requirement(s), and the length of the first compensating line segment 128a may be correlated with a length of the first breakpoint CP1. In some embodiments, a ratio of the length of the first compensating line segment 128a to the length of the first breakpoint CP1 may be greater than or equal to 0.7 and less than or equal to 1.3, but not limited thereto. In some embodiments, the length of the first compensating line segment 128a may be greater than or equal to 10 μm and less than or equal to 60 μm, but not limited thereto. In some embodiments, a difference between the length of the first compensating line segment 128a and the length of the first breakpoint CP1 may be less than or equal to 4 µm, but not limited thereto. It should be note that, if the difference between the length of the first compensating line segment 128a and the length of the first breakpoint CP1 is too large (e.g., the ratio of the length of the first compensating line segment 128a to the length of the first breakpoint CP1 is less than 0.7 or greater than 1.3, or the difference between the length of the first compensating line segment 128a and the length of the first breakpoint CP1 is greater than 4 µm), the first compensating line segment 128a would be easily aware by user, and the first compensating line segment 128a would lose its compensating function, thereby influencing the viewing quality. For instance, in the condition that the length of the first breakpoint CP1 is 10 µm, the length of the first compensating line segment 128a may range from 7 µm to 13 µm, but not limited thereto.

Similarly, the first metal mesh 122 may include a second compensating line segment 128b to compensate or reduce the bad visual effect caused by the second breakpoint CP2. In FIG. 1 and FIG. 2, the second compensating line segment 128b does not completely overlap (i.e., partially overlap or does not overlap) the second breakpoint CP2, and the second compensating line segment 128b is separated from the and electrically insulated from the third metal line segment S3 and the fourth metal line segment S4.

In the present invention, the second compensating line segment 128b needs to be adjacent to the second breakpoint CP2 to compensate or reduce the bad visual effect caused by the second breakpoint CP2. In some embodiments, the second compensating line segment 128b may have two second segment ends 128be, a minimum distance between the second breakpoint CP2 and each second segment end 128be may be less than or equal to 50 µm or be less than or equal to 15 µm, but not limited thereto. In some embodiments, a minimum distance between the second compensating line segment 128b (any portion of the second compensating line segment 128b) and the second breakpoint CP2 may be less than or equal to 50 µm or be less than or equal to 15 µm, but not limited thereto.

The disposition of the second compensating line segment 128b may be similar to the disposition of the first compensating line segment 128a. In some embodiments (as shown in FIG. 1 and FIG. 2), the second compensating line segment 128b does not overlap the second breakpoint CP2. For example, in FIG. 1 and FIG. 2, the second compensating line segment 128b may be parallel to the second direction D2, such that the second compensating line segment 128b may be parallel to the third metal line segment S3, the fourth metal line segment S4 and the second imaginary line AL2, but not limited thereto. In FIG. 1 and FIG. 2, second distance DS2 may exist between the second compensating line segment 128b and the second breakpoint CP2, and the second distance DS2 may be greater than or equal to 3 µm and less than or equal to 50 µm, or may be greater than or equal to 3 µm and less than or equal to 15 µm, but not limited thereto.

In some embodiments (as shown in FIG. 1 and FIG. 2), an angle between the second direction D2 and a connecting line connected by a midpoint of the second compensating line segment 128b and a midpoint of the second breakpoint CP2 may be greater than or equal to 80 degrees and less than or equal to 100 degrees, but not limited thereto. According to this design, an offset of the second compensating line segment 128b with respect to the second breakpoint CP2 in the second direction D2 may be decreased.

In the present invention, a length of the second compensating line segment 128b may be designed based on requirement(s), and the length of the second compensating line segment 128b may be correlated with a length of the second breakpoint CP2. In some embodiments, a ratio of the length of the second compensating line segment 128b to the length of the second breakpoint CP2 may be greater than or equal to 0.7 and less than or equal to 1.3, but not limited thereto. In some embodiments, the length of the second compensating line segment 128b may be greater than or equal to 10 µm and less than or equal to 60 µm, but not limited thereto. In some embodiments, a difference between the length of the second compensating line segment 128b and the length of the second breakpoint CP2 may be less than or equal to 4 µm, but not limited thereto.

In the present invention, the first compensating line segment 128a and the second compensating line segment 128b may be designed to be the same or different based on requirement(s).

In the present invention, the first metal line segment S1, the second metal line segment S2, the third metal line segment S3, the fourth metal line segment S4, the first compensating line segment 128a and the second compensating line segment 128b are included in the first conductive layer 120. Therefore, compared with the technique that the compensating line segment and the metal line are included in different layers, the present invention may decrease the cost of the first metal mesh 122 having the compensating line segment and reduce the capacitance between the compensating line segment and the metal line configured to sense (e.g., the capacitor formed by the overlap of different conductive layers can be prevented). Moreover, in some embodiments (e.g., under the condition that the first conductive layer 120 is disposed on a flat surface), a top surface of the first metal line segment S1, a top surface of the second metal line segment S2, a top surface of the first compensating line segment 128a and a top surface of the second compensating line segment 128b are coplanar with each other (as shown in FIG. 3), but not limited thereto.

In the present invention, the electronic device 100 may further include any suitable component or any suitable structure. In some embodiments (as shown in FIG. 3) the conductive layer included in the electronic device 100 may further include a second conductive layer 130, and at least a portion of the first conductive layer 120 and at least a portion of the second conductive layer 130 are separated from each other. For instance, in some embodiments (as shown in FIG. 3), the electronic device 100 may further include an insulating layer 140 disposed between the first conductive layer 120 and the second conductive layer 130, wherein the material of the insulating layer 140 may include such as silicon oxide ($SiO_x$), silicon nitride ($SiN_y$), silicon oxynitride ($SiO_xN_y$), organic insulating material, other suitable insulating material or a combination thereof, but not limited thereto. For example, in some embodiments (not shown in drawings), the substrate 110 may be disposed between the first conductive layer 120 and the second conductive layer 130 (i.e., the first conductive layer 120 and the second conductive layer 130 are respectively disposed on two opposite surfaces of the substrate 110), but not limited thereto.

In some embodiments, the second conductive layer 130 may include the second metal mesh 132, and the design of the second metal mesh 132 may be similar to the design of the first metal mesh 122. Thus, the parts of the second metal mesh 132 the same as the first metal mesh 122 will not be redundantly described. It should be noted that the relation between the first metal mesh 122 and the second metal mesh 132 may be designed based on requirement(s). For instance, in the top view, the first metal mesh 122 and the second metal mesh 132 may be misaligned with each other. In some embodiments, and an intersection of two metal lines 122*a* and 122*b* of the first metal mesh 122 may not overlap an intersection of two metal lines of the second metal mesh 132 (e.g., the intersection of two metal lines 122*a* and 122*b* of the first metal mesh 122 is situated at the center of the metal mesh unit of the second metal mesh 132), but not limited thereto. It should be noted that the mesh electrodes of the second metal mesh 132 may not be arranged in the direction X (the first mesh electrodes 124 and the second mesh electrodes 126 of the first metal mesh 122 are arranged in the direction X), and the length-direction of the mesh electrodes of the second metal mesh 132 may not be parallel to the direction Y (the length-directions of the first mesh electrodes 124 and the second mesh electrodes 126 of the first metal mesh 122 are parallel to the direction Y). For instance, the mesh electrodes of the second metal mesh 132 are alternately arranged in the direction Y, and the length-direction of the mesh electrodes of the second metal mesh 132 may be parallel to the direction X, but not limited thereto.

Owing to the existence of the second metal mesh 132, the first metal mesh 122 and the second metal mesh 132 may simultaneously sense. For example, the first metal mesh 122 and the second metal mesh 132 may serve as a self-capacitance sensor or a mutual-capacitance sensor, but not limited thereto.

The electronic device of the present invention is not limited to the above embodiments. Further embodiments of the present invention are described below. For ease of comparison, same components will be labeled with the same symbol in the following. The following descriptions relate the differences between each of the embodiments, and repeated parts will not be redundantly described.

Figure 4:
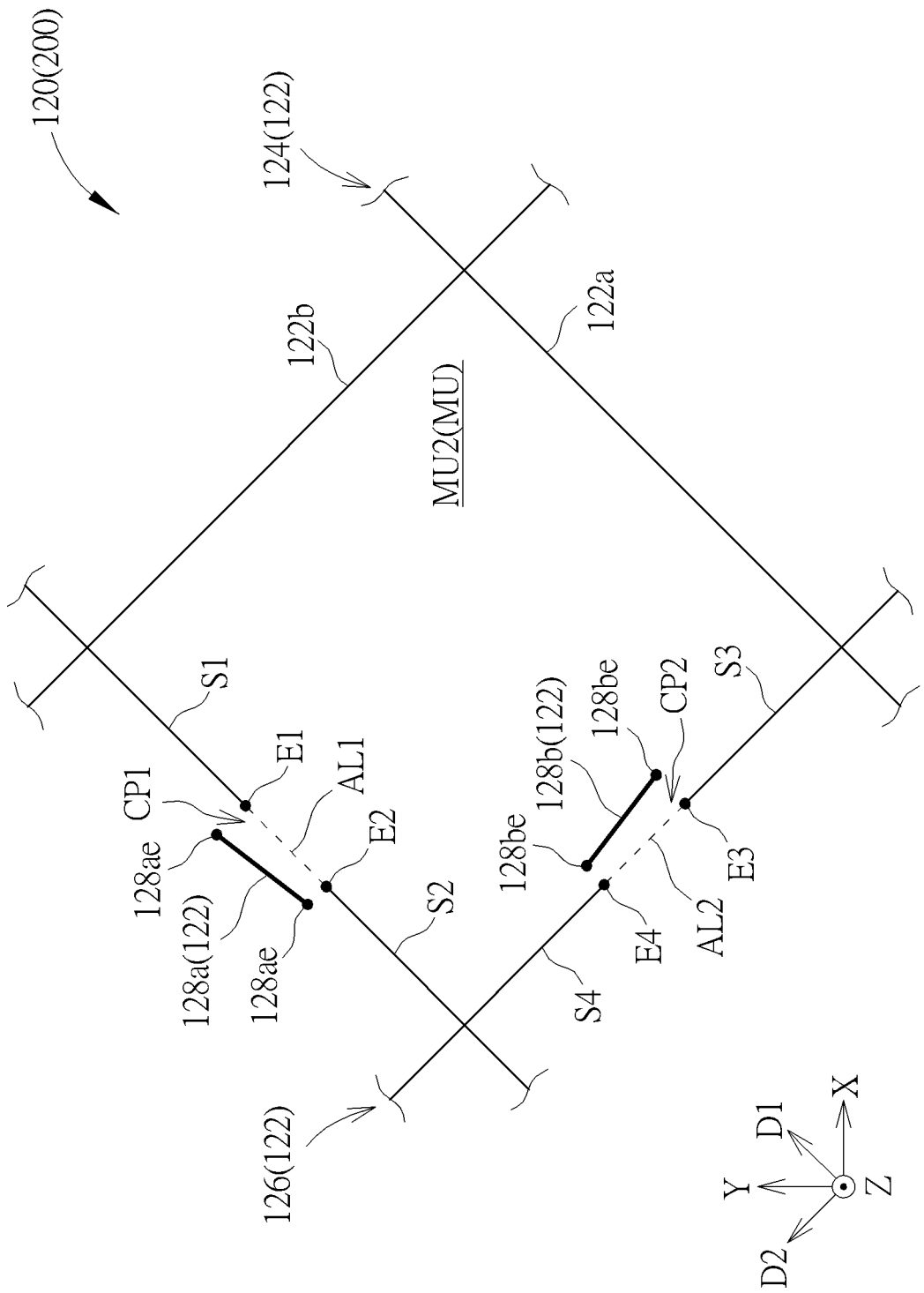
FIG. 4 is a schematic diagram of a top view illustrating a first conductive layer of an electronic device according to a second embodiment of the present invention.

Referring to FIG. 4, FIG. 4 is a schematic diagram of a top view illustrating a first conductive layer of an electronic device according to a second embodiment of the present invention. As shown in FIG. 4, a difference between this embodiment and the first embodiment is the design of the compensating line segment of the electronic device 200. In FIG. 4, the first compensating line segment 128*a* may not overlap the first breakpoint CP1, and the first compensating line segment 128*a* may not be parallel to the first direction D1 and the second direction D2. Optionally, the second compensating line segment 128*b* may not overlap the second breakpoint CP2, and the second compensating line segment 128*b* may not be parallel to the first direction D1 and the second direction D2. It should be noted that an angle between the first compensating line segment 128*a* and the first direction D1 may be the same as or different from an angle between the second compensating line segment 128*b* and the second direction D2.

In some embodiments (not shown in drawings), the disposition of the second compensating line segment 128*b* may be different from the disposition of the first compensating line segment 128*a*. For example, the first compensating line segment 128*a* may not be parallel to the first direction D1 and the second direction D2, and the second compensating line segment 128*b* may be parallel to the second direction D2, but not limited thereto.

Figure 5:
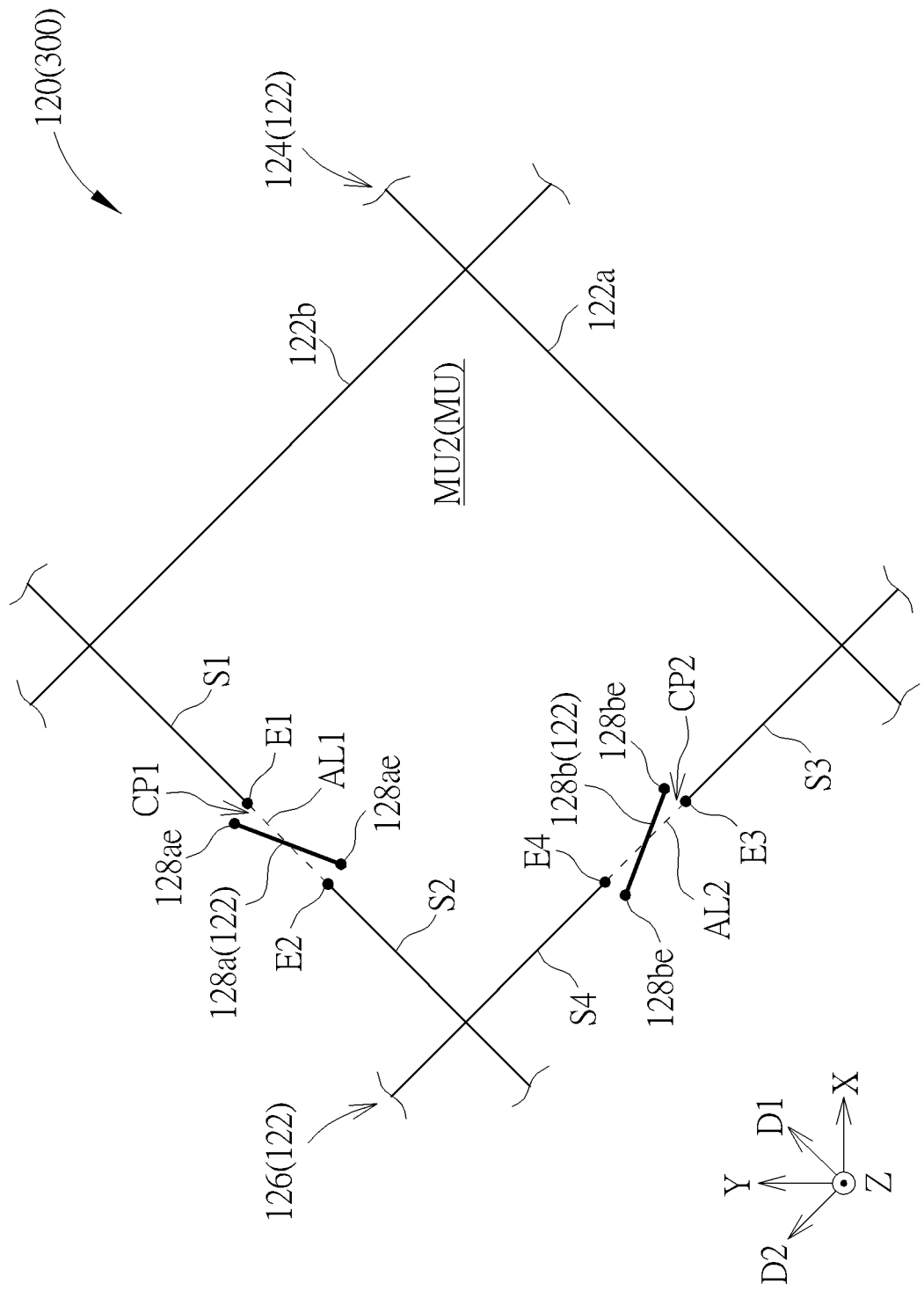
FIG. 5 is a schematic diagram of a top view illustrating a first conductive layer of an electronic device according to a third embodiment of the present invention.

Referring to FIG. 5, FIG. 5 is a schematic diagram of a top view illustrating a first conductive layer of an electronic device according to a third embodiment of the present invention. As shown in FIG. 5, a difference between this embodiment and the first embodiment is the design of the design of the compensating line segment of the electronic device 300. In FIG. 5, the first compensating line segment 128*a* may have at least one intersection with the first imaginary line AL1 (i.e., the first compensating line segment 128*a* partially overlaps the first breakpoint CP1). Since the first compensating line segment 128*a* does not completely overlap the first breakpoint CP1, the first compensating line segment 128*a* is not parallel to the first direction D1. For example, in some embodiments (as shown in FIG. 5), the first compensating line segment 128*a* may not be parallel to the first direction D1 and the second direction D2, but not limited thereto. For example, in some embodiments (not shown in drawings), the first compensating line segment 128*a* may be perpendicular to the first direction D1 or parallel to the second direction D2, but not limited thereto.

The position of the intersection of the first compensating line segment 128*a* and the first imaginary line AL1 may be designed based on requirement(s). In some embodiments (as shown in FIG. 5), the intersection of the first compensating line segment 128*a* and the first imaginary line AL1 may be situated at a midpoint of a connecting line connected by the first end E1 and the second end E2, but not limited thereto. In some embodiments (as shown in FIG. 5), the intersection of the first compensating line segment 128*a* and the first imaginary line AL1 may be situated at a midpoint of the first compensating line segment 128*a*, but not limited thereto.

In FIG. 5, the second compensating line segment 128*b* may have at least one intersection with the second imaginary line AL2 (i.e., the second compensating line segment 128*b* partially overlaps the second breakpoint CP2), and the second compensating line segment 128*b* may not be parallel to the second direction D2. For example, in some embodiments (as shown in FIG. 5), the second compensating line segment 128*b* may not be parallel to the first direction D1 and the second direction D2, but not limited thereto. For example, in some embodiments (not shown in drawings), the second compensating line segment 128*b* may be perpendicular to the second direction D2 or parallel to the first direction D1, but not limited thereto. It should be noted that the angle between the first compensating line segment 128*a* and the first direction D1 may be the same as or different from the angle between the second compensating line segment 128*b* and the second direction D2.

The position of the intersection of the second compensating line segment 128*b* and the second imaginary line AL2 may be designed based on requirement(s). In some embodiments (as shown in FIG. 5), the intersection of the second compensating line segment 128*b* and the second imaginary line AL2 may be situated at a midpoint of a connecting line connected by the third end E3 and the fourth end E4, but not limited thereto. In some embodiments (as shown in FIG. 5), the intersection of the second compensating line segment 128*b* and the second imaginary line AL2 may be situated at a midpoint of the second compensating line segment 128*b*, but not limited thereto.

In some embodiments (not shown in drawings), the disposition of the second compensating line segment 128*b* may be different from the disposition of the first compensating line segment 128*a*. For instance, the first compensating line segment 128*a* may have at least one intersection with the first imaginary line AL1, and the second compensating line segment 128*b* may not overlap the second breakpoint CP2, but not limited thereto.

Figure 6:
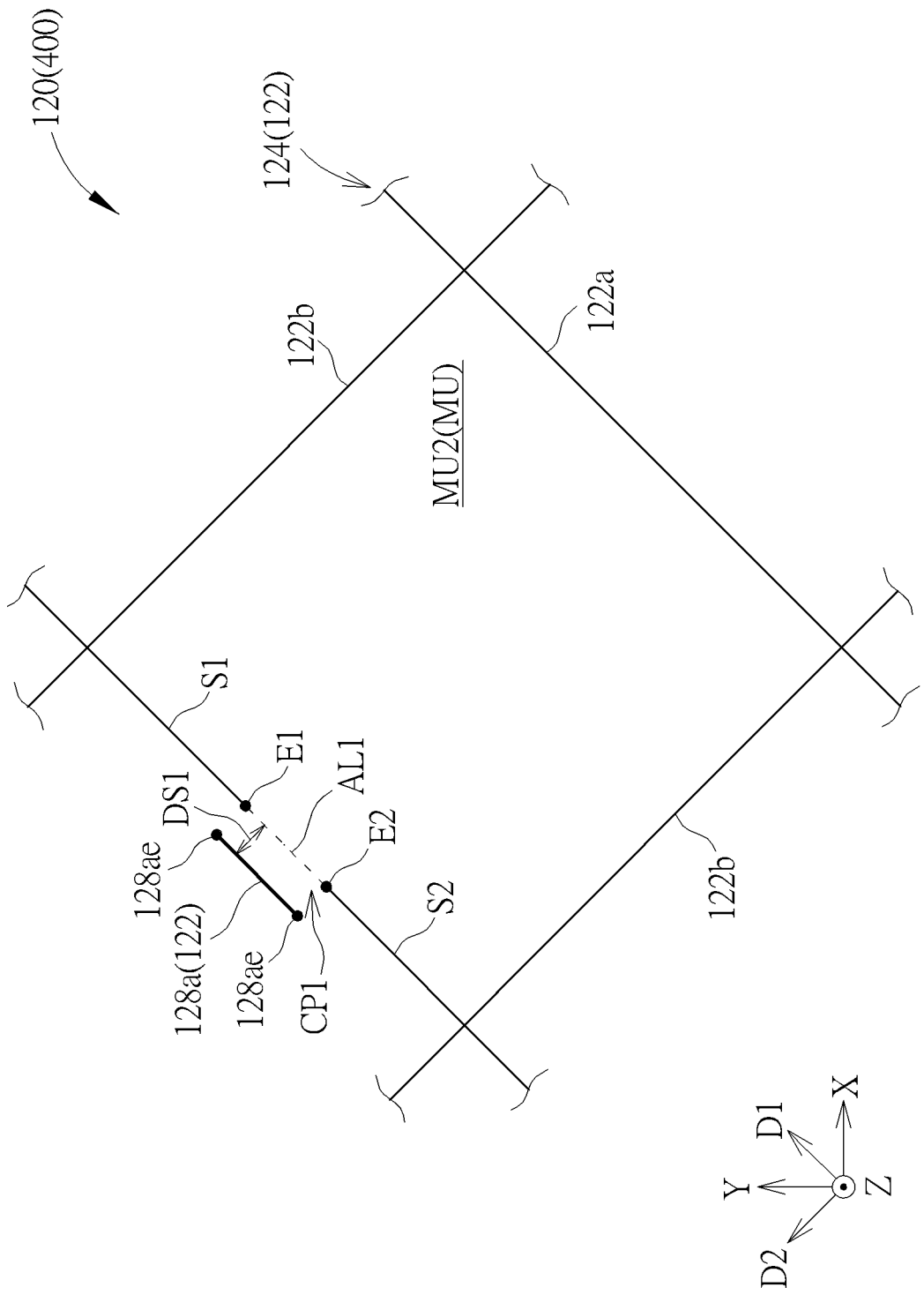
FIG. 6 is a schematic diagram of a top view illustrating a first conductive layer of an electronic device according to a fourth embodiment of the present invention.

Referring to FIG. 6, FIG. 6 is a schematic diagram of a top view illustrating a first conductive layer of an electronic device according to a fourth embodiment of the present invention. As shown in FIG. 6, a difference between this embodiment and the first embodiment is the design of the breakpoint of the electronic device 400. In FIG. 6, at least one breakpoint of the first metal mesh 122 may be disposed in the first mesh electrode 124, so as to adjust the electrical property of the first mesh electrode 124. For example, the present invention may adjust the resistance of the first mesh electrode 124 by changing the number of the breakpoint(s) in the first mesh electrode 124, but not limited thereto.

In detail, the metal mesh unit MU2 may include the first metal line segment S1 and the second metal line segment S2, the first metal line segment S1 and the second metal line segment S2 are separated from each other and extend along the first direction D1, and the first breakpoint CP1 exists between the first end E1 of the first metal line segment S1 and the second end E2 of the second metal line segment S2. The first metal line segment S1 and the second metal line segment S2 are included in the first mesh electrode 124, such that the first metal line segment S1 is electrically connected to the second metal line segment S2. In some embodiments (as shown in FIG. 6), in one metal mesh unit MU2, the first metal line segment S1 and the second metal line segment S2 may be electrically connected to each other through other portion of this metal mesh unit MU2, but not limited thereto. In some embodiments (not shown in drawings), the first metal line segment S1 and the second metal line segment S2 may be electrically connected to each other through another metal mesh unit MU, but not limited thereto.

The design of the first compensating line segment 128a may be referred to one of aforementioned embodiments. For example, in FIG. 6, the first compensating line segment 128a may not overlap the first breakpoint CP1, and the first compensating line segment 128a may be parallel to the first direction D1, but not limited thereto.

Optionally, in some embodiments (not shown in drawings), the metal mesh unit MU2 may further include the third metal line segment S3 and the fourth metal line segment S4, the third metal line segment S3 and the fourth metal line segment S4 may be separated from each other and extend along the second direction D2, the second breakpoint CP2 may exist between the third end E3 of the third metal line segment S3 and the fourth end E4 of the fourth metal line segment S4. The third metal line segment S3 and the fourth metal line segment S4 may be included in the first mesh electrode 124, such that the third metal line segment S3 may be electrically connected to the fourth metal line segment S4. In some embodiments (not shown in drawings), under the condition that the first breakpoint CP1 and the second breakpoint CP2 exist in the same metal mesh unit MU2, the first metal line segment S1, the second metal line segment S2, the third metal line segment S3 and the fourth metal line segment S4 may be electrically connected to each other through another metal mesh unit MU, but not limited thereto. It should be noted that the design of the second compensating line segment 128b may be referred to one of aforementioned embodiments.

In summary, since the compensating line segment is adjacent to the breakpoint, and the compensating line segment does not completely overlap the breakpoint, the compensating line segment has the function reducing or compensating the bad visual effect caused by the breakpoint. Also, since the compensating line segment and the metal line segment(s) adjacent to the breakpoint belong to the same conductive layer, the cost of the metal mesh having the compensating line segment can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
a substrate; and
a first conductive layer disposed on the substrate, wherein the first conductive layer comprises a first metal mesh comprising:
a first metal line segment extending along a first direction and having a first end;
a second metal line segment extending along the first direction and having a second end, wherein the first metal line segment and the second metal line segment are separated from each other, a first imaginary line extending along the first direction passes through the first end and the second end, and a part of the first imaginary line existing between the first end and the second end is defined as a first breakpoint; and
a first compensating line segment separated from and electrically insulated from the first metal line segment and the second metal line segment, wherein the first compensating line segment does not completely overlap the first breakpoint in a normal direction of the substrate, the first compensating line segment has two first segment ends, and a minimum distance between the first breakpoint and each of the first segment ends is less than or equal to 50 µm;
wherein the normal direction of the substrate is perpendicular to the first direction.

2. The electronic device of claim 1, wherein the first metal mesh comprises:
a first mesh electrode comprising the first metal line segment; and
a second mesh electrode comprising the second metal line segment, wherein the first mesh electrode and the second mesh electrode are separated from each other.

3. The electronic device of claim 1, wherein the first metal mesh comprises:
a first mesh electrode comprising the first metal line segment and the second metal line segment, wherein the first metal line segment is electrically connected to the second metal line segment.

4. The electronic device of claim 1, wherein a minimum distance between the first compensating line segment and the first breakpoint is less than or equal to 50 µm.

5. The electronic device of claim 1, wherein the first compensating line segment has at least one intersection with the first imaginary line.

6. The electronic device of claim 1, wherein the first compensating line segment does not overlap the first breakpoint in the normal direction of the substrate.

7. The electronic device of claim 6, wherein the first compensating line segment is parallel to the first direction, and a first distance exists between the first compensating line segment and the first breakpoint.

8. The electronic device of claim 7, wherein the first distance is greater than or equal to 3 µm and less than or equal to 50 µm.

9. The electronic device of claim 7, wherein an angle between the first direction and a connecting line connected by a midpoint of the first compensating line segment and a midpoint of the first breakpoint is greater than or equal to 80 degrees and less than or equal to 100 degrees.

10. The electronic device of claim 1, wherein a ratio of a length of the first compensating line segment to a length of the first breakpoint is greater than or equal to 0.7 and less than or equal to 1.3.

11. The electronic device of claim 1, wherein a length of the first compensating line segment is greater than or equal to 10 μm and less than or equal to 60 μm.

12. The electronic device of claim 1, wherein a difference between a length of the first compensating line segment and a length of the first breakpoint is less than or equal to 4 μm.

13. The electronic device of claim 1, wherein the first metal mesh comprises:
- a third metal line segment extending along a second direction which is not parallel to the first direction, and the third metal line segment having a third end;
- a fourth metal line segment extending along the second direction and having a fourth end, wherein the third metal line segment and the fourth metal line segment are separated from each other, a second imaginary line extending along the second direction passes through the third end and the fourth end, and a part of the second imaginary line existing between the third end and the fourth end is defined as a the second breakpoint; and
- a second compensating line segment separated from and electrically insulated from the third metal line segment and the fourth metal line segment, wherein the second compensating line segment does not completely overlap the second breakpoint in the normal direction of the substrate, the second compensating line segment has two the second segment ends, and a minimum distance between the second breakpoint and each of the second segment ends is less than or equal to 50 μm;

wherein the normal direction of the substrate is perpendicular to the second direction.

14. The electronic device of claim 1, further comprising a second conductive layer, wherein an insulating layer or the substrate is disposed between the first conductive layer and the second conductive layer, and the second conductive layer comprises a second metal mesh.

15. The electronic device of claim 1, wherein a top surface of the first metal line segment, a top surface of the second metal line segment and a top surface of the first compensating line segment are coplanar with each other.

* * * * *